Patented Nov. 16, 1948

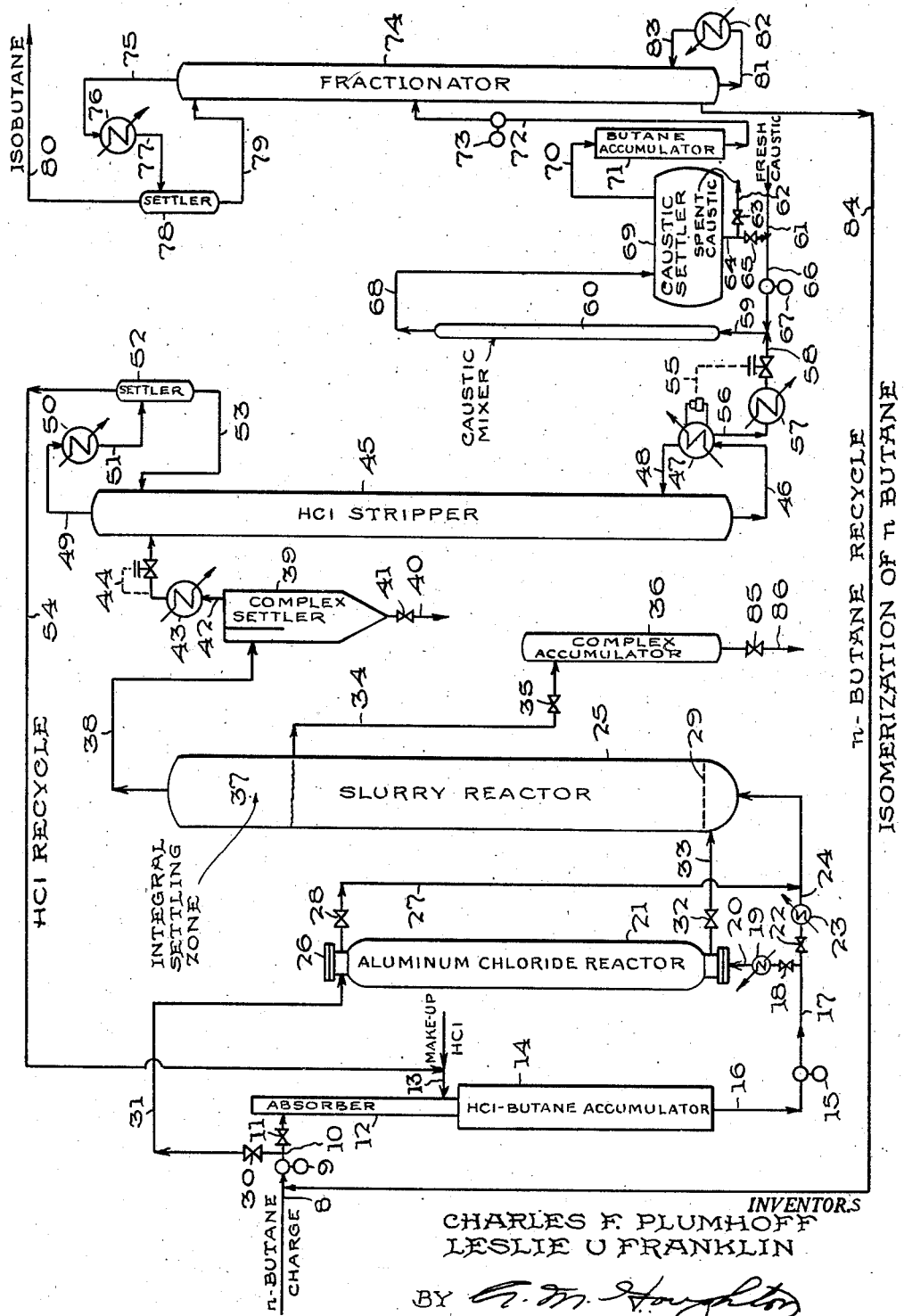

2,454,149

UNITED STATES PATENT OFFICE 2,454,149

ISOMERIZATION OF NORMAL BUTANE

Leslie U. Franklin and Charles F. Plumhoff, Port Arthur, Tex., assignors to Gulf Oil Corporation, Pittsburgh, Pa., a corporation of Pennsylvania Application October 31, 1945, Serial No. 625,874

3 Claims. (Cl. 260—683.5)

This invention relates to the isomerization of normal butane in the presence of an aluminum chloride catalyst, and it is particularly concerned with a liquid-phase process of producing isobutane substantially free from aluminum chloride.

The process of this invention comprises mixing a charge of normal butane with hydrogen chloride, dividing the normal butane-hydrogen chloride mixture into two portions heated to isomerizing temperatures, passing one portion through a first isomerizing zone containing solid aluminum chloride under butane isomerizing conditions adapted to produce hydrocarbon side reaction products; contacting in a second isomerizing zone the effluent stream from the first isomerizing zone and the remaining portion of the heated normal butane-hydrogen chloride mixture with an aluminum chloride-hydrocarbon complex slurry catalyst under butane isomerizing conditions adapted to produce additional hydrocarbon side reaction products and to effect removal of aluminum chloride from the isomerization products by reacting said aluminum chloride with the hydrocarbon side reaction products to form insoluble aluminum chloride-hydrocarbon complexes and separating said insoluble aluminum chloride-hydrocarbon complexes from the isomerization products.

Aluminum chloride catalysts in solid and liquid form are effective isomerization catalysts, but they are not free from disadvantages. Disadvantages develop from the fact that aluminum chloride is soluble in liquid hydrocarbons and sublimes with gaseous hydrocarbons. This results in carry-over of catalyst in solution and sometimes in suspension in the reactor effluent. The carry-over of catalyst from the reaction system is undesirable because of removal difficulties in the final product, because of the loss of catalyst and because of mechanical troubles which result therefrom such as corrosion and erosion of equipment and the plugging of transfer lines.

It is an object achieved by this invention to provide a liquid-phase butane isomerization process in which migration of the aluminum chloride catalyst in minimized and improved use is made of the catalytic activity of the aluminum chloride.

Another object achieved by the present invention is to provide a liquid-phase process for the isomerization of normal butane in the presence of aluminum chloride under conditions adapted to produce isobutane substantially free from aluminum chloride.

Another object achieved by the present invention is to provide a liquid-phase process for the isomerization of normal butane under conditions adapted to produce controlled amounts of hydrocarbon side reaction products.

Another object achieved by this invention is to provide a liquid-phase process for the isomerization of normal butane in the presence of aluminum chloride catalyst under conditions adapted to produce aluminum chloride-hydrocarbon complexes.

A further object achieved by this invention is to provide a process for removing aluminum chloride from the reaction products obtained by the liquid-phase isomerization of normal butane in the presence of an aluminum chloride catalyst.

A still further object achieved by this invention is to provide an effective and economical process for the isomerization of normal butane in which a given quantity of isobutane may be produced with a substantially smaller sized reaction system than when employing only solid aluminum chloride as the catalyst for isomerization.

Other objects achieved by this invention will become more apparent in the following detailed description thereof.

Improved results can be obtained in liquid-phase isomerization of normal butane in the presence of an aluminum chloride catalyst by carrying out the process under such conditions that a controlled amount of side reaction takes place to produce products other than isomerization products. We have found that by dividing a charge of butane containing hydrogen chloride into two parts heated to isomerizing temperatures, passing one part through a body of solid aluminum chloride and passing the other part through a body of aluminum chloride-hydrocarbon complex slurry particularly advantageous results can be obtained. For instance, when operating in this manner, the migration of aluminum chloride catalyst in the isomerization product stream may be avoided or substantially reduced and satisfactory yields of isobutane may be produced in a smaller sized reaction system than when employing only solid aluminum chloride as the catalyst.

The butane-hydrogen chloride charge may be heated and then divided into separate streams leading to each reactor or it may be divided into separate streams and then each stream heated to the same or different isomerizing temperatures. The latter method of operation is advantageous in that it offers greater flexibility. The description which follows hereinafter is with respect to the latter more advantageous method of operation.

In brief, the process of our invention comprises mixing a charge of normal butane with hydrogen chloride, dividing the solution into two portions, separately heating the two portions to isomerizing temperatures, passing one portion under isomerizing conditions upwardly through a body of aluminum chloride lumps or granules, thereby isomerizing a portion of the normal butane to isobutane and forming an effluent which is a butane-hydrogen chloride solution of aluminum chloride containing some hydrocarbon side reaction products, aluminum chloride-hydrocarbon complex and free aluminum chloride, mixing the thus formed reactor effluent with the remaining heated portion of the normal butane-hydrogen chloride solution, passing the mixture under isomerizing conditions upwardly into a second isomerization zone wherein the aluminum chloride carried in butane solution from the first isomerization zone is substantially completely reacted with the hydrocarbon side reaction products to form aluminum chloride-hydrocarbon complexes, and separating said aluminum chloride-hydrocarbon complexes from the product stream in the second zone. The effluent from the second isomerization zone may then be subjected to a further settling operation to remove final traces of aluminum chloride-hydrocarbon complexes. The complex-free product stream subsequently may be stripped of hydrogen chloride, washed with a caustic solution, and finally fractionated to recover separately isobutane and normal butane. The normal butane may advantageously be recycled to the beginning of the process.

A convenient method of measuring the amount of side reaction is by the ultimate yield of the process which may be defined as the percentage of isobutane produced, based on the consumption of normal butane. If the process is carried out so that the ultimate yield is substantially less than 100 per cent, a sufficient amount of hydrocarbon side reaction products is formed which may be reacted with aluminum chloride dissolved and suspended in the butane isomerization products from the first zone to produce aluminum chloride-hydrocarbon complexes insoluble in the butanes. By separating the aluminum chloride-hydrocarbon complexes thus formed, substantially complete separation of aluminum chloride contained in the liquid butane isomerization products can be effected. The aluminum chloride-hydrocarbon complexes produced in accordance with the present invention contain some active catalytic materials so that the aluminum chloride not only is removed from the reaction products but also is converted into materials capable of effecting additional isomerization of normal butane.

The aluminum chloride-hydrocarbon complexes referred to herein are chemical combinations of aluminum chloride and hydrocarbon side reaction products which are formed during the isomerization reaction. The hydrocarbon side reaction products are believed to be mixtures of cracking, polymerization and alkylation products. The aluminum chloride-hydrocarbon complexes produced according to the process of the invention vary in catalytic activity from active aluminum chloride-hydrocarbon complexes to inactive aluminum chloride-hydrocarbon complexes. In carrying out the process of the present invention, there appears to be no sharp line of separation between the active aluminum chloride-hydrocarbon complexes and the inactive aluminum chloride-hydrocarbon complexes. Instead, there appears to be a gradual change from active complexes through less active complexes to inactive or fully spent complexes. The less active and finally the spent complexes are formed presumably by the combination of additional hydrocarbon side reaction products with the aluminum chloride in the active complexes. As the active aluminum chloride-hydrocarbon complexes become inactive by further use they tend to become lighter in gravity and less viscous. Thus the spent complexes tend to rise to the top of a body of mixed complexes from where they can be withdrawn. It should be understood that even though the inactive aluminum chloride-hydrocarbon complexes are substantially completely spent for catalyzing the isomerization of normal butane they may possess a substantial amount of catalytic activity for promoting other hydrocarbon conversions. The aluminum chloride-hydrocarbon complexes have the particular advantage, for the purpose of our invention, that they are substantially completely insoluble in normal butane and isobutane and can be relatively easily separated therefrom.

Aluminum chloride-hydrocarbon complex slurry, as referred to herein and in the appended claims, is a mixture of free aluminum chloride and aluminum chloride-hydrocarbon complexes.

In general, a temperature within the range of 160° to 300° F. and a corresponding pressure of 300 to 600 pounds per square inch is required to effect substantial conversion of normal butane to isobutane in the liquid phase. In the apparatus employed in carrying out the present invention, we have found it most advantageous to use an isomerization temperature within the range of 200° to 260° F. and a pressure within the range of 300 to 450 pounds per square inch.

The ultimate yield referred to herein is a measure of the efficiency of the conversion of normal butane to isobutane and, consequently, it is also a measure of the amount of side reactions which occur. It is calculated by dividing the mols of isobutane formed by the mols of normal butane converted, all multiplied by 100. The ultimate yield varies inversely with the hydrocarbon side reaction products and is controlled independently of the yield per pass by a suitable control of the independent reaction variables such as temperature or space velocity. In Table I are illustrated the variations in ultimate yield obtainable by changing the space velocity and reaction temperatures. The figures in Table I are averages of values obtained during one week of operation of a semi-commercial unit. It should be understood that the desirable space velocity at a given temperature will vary with the design of apparatus, but can readily be determined in a few trial runs.

TABLE I

| Space Velocity (Liq.) | Temperature, ° F. | | Yield of Isobutane, Per cent | |
|---|---|---|---|---|
| | 1st Isomerization Zone | 2nd Isomerization Zone | Per Pass | Ultimate |
| 7.0 | 225 | 260 | 44.6 | 90.9 |
| 2.3 | 225 | 255 | 48.4 | 86.8 |
| 5.6 | 200 | 260 | 39.8 | 92.5 |
| 5.4 | 200 | 230 | 31.5 | 94.4 |

It may be observed from Table I that the ultimate yield was increased from 86.8 per cent to 90.9 per cent, while maintaining a relatively high yield per pass, by increasing the space velocity from 2.3 to 7.0 and maintaining the respective isomerizing temperatures substantially constant. When the space velocity was maintained fairly constant at an intermediate level of about 5.5 and the temperature in the first isomerizing zone was held constant at a lower level of 200° F., the effect of decreasing the temperature to 230° F. in the second isomerizing zone was to increase the ultimate yield from 92.5 per cent to 94.4 per cent. Furthermore, by increasing the space velocity from 2.3 to 5.6, while lowering the temperature of the first isomerizing zone, only, the ultimate yield was increased from 86.8 per cent to 92.5 per cent. Other combinations of space velocity and temperature of one or both isomerizing zones are apparent from Table I as means for controlling the ultimate yield. Our experiences have shown that the yield per pass may be controlled independently of the space velocity and temperatures within the limits of isomerizing conditions, by varying the proportions of the fresh butane-hydrogen chloride charge to the respective isomerizing zones, the greater proportion charged to the first zone producing the higher total yield per pass. However, it is desirable to limit the proportion of the fresh charge to the first isomerizing zone to that total yield per pass from both zones which will not cause excessive carry-over of catalyst in the effluent from the first isomerizing zone to the second isomerizing zone. This total yield per pass normally should not exceed about 50 per cent. For reasons of economy it should usually be not lower than about 40 per cent.

We have found that it is desirable to mix the butane feed with hydrogen chloride prior to its being passed through the respective isomerization zones, especially the zone containing solid aluminum chloride. We have observed that if hydrogen chloride is not present when butane contacts aluminum chloride it is exceedingly difficult to remove dissolved aluminum chloride therefrom, even though an excess of hydrogen chloride and hydrocarbon side reaction products is present in a subsequent isomerization zone. As indicated above, when carrying out the process of our invention the charge of normal butane containing dissolved hydrogen chloride is divided into two streams heated to isomerizing temperatures. In carrying out the invention in our apparatus, we have found that it is more advantageous at the start of a run to pass a minor proportion of the charge through the first zone in an upward direction and a major proportion through the second zone also in an upward direction. For instance, we have found that an optimum yield of isobutane is obtained with maximum catalyst utility when about 10 per cent of the butane charge is fed to the zone containing solid aluminum chloride and 90 per cent of the butane charge is fed to the zone containing aluminum chloride-hydrocarbon complex slurry.

As the quantity of catalyst in the first reaction zone becomes less and its activity decreases, for maximum utility of catalyst, the proportion of the fresh butane charge directed to this zone should be increased until, at the time when the catalyst needs renewal, more than 90 per cent of the charge is directed to the first reaction zone and less than 10 per cent to the second reaction zone. The desired division of the butane charge between the two zones is governed at any one time by the yield of isobutane per pass from the second reaction zone. This analysis need not be precise for this purpose; one of the well known rapid weathering tests for isobutane is usually satisfactory. If more accuracy is desired a rapid analysis may be made by an infrared analytical instrument. However, we have found that, after some practice with a given semi-commercial size isomerization unit, a correlation of yield per pass and the operating temperature or pressure at the bottom of the hydrogen chloride stripping column which immediately follows the second reaction zone, may be developed as a guide for distribution of the butane charge to the two reaction zones. For instance, if the hydrogen chloride stripping column is held by instrument at constant pressure, a change in yield per pass will change the temperature at the bottom of this column. And, if this column is held at constant temperature by instrument, a change in yield per pass will be observed to cause a change in pressure of this column. These correlations can be used to reduce the frequency of the analytical tests but are usually not relied upon in cases of doubt.

According to one embodiment of our invention shown in the figure, we make use of an aluminum chloride reactor and a slurry reactor connected in series. A stream of normal butane containing some hydrogen chloride is divided into two portions and then each portion is heated to a butane isomerizing temperature. One heated portion is introduced into the bottom of the aluminum chloride reactor which contains solid aluminum chloride advantageously in the form of lumps or granules. As the normal butane-hydrogen chloride solution passes up through the solid aluminum chloride, some normal butane is converted to isobutane and some hydrocarbon side reaction products are formed. A portion of the hydrocarbon side reaction products unites with some aluminum chloride to form insoluble aluminum chloride-hydrocarbon complexes.

The effluent from the top of the aluminum chloride reactor consists of a solution of normal butane, isobutane, hydrogen chloride, and aluminum chloride together with hydrocarbon side reaction products and aluminum chloride-hydrocarbon complexes. The effluent from the aluminum chloride reactor and the remaining portion of heated butane-hydrogen chloride solution are introduced into the bottom of the slurry reactor, which may be empty at the start of a run. As the run proceeds, however, a reservoir of aluminum chloride-hydrocarbon complex slurry accumulates in the slurry reaction. As previously mentioned, the slurry consists of a mixture of aluminum chloride and aluminum chloride-hydrocarbon complexes. Even though the inactive aluminum chloride-hydrocarbon complexes are less dense than the active aluminum chloride-hydrocarbon complexes there is very little tendency for separate layers to be formed during the operation of the process of the present invention. It is generally noticeable, however, that the aluminum chloride-hydrocarbon complexes in the upper portion of the slurry reactor are inactive, whereas the aluminum chloride-hydrocarbon complexes in the lower portion of the slurry reactor possess considerable butane isomerizing catalytic activity. When the solid aluminum chloride in the aluminum chloride reactor has been completely converted into slurry, as evidenced by a drop in the ultimate yield of isobutane, the slurry is transferred to the slurry reactor. Advantageously, the slurry may be transferred by introducing butane under pressure into the top of the aluminum chloride reactor and forcing the slurry out the bottom. After the transfer of slurry is complete, the aluminum chloride reactor can be recharged with solid aluminum chloride and held in readiness for future use.

Free aluminum chloride contained in the stream of reaction products from the aluminum chloride reactor is removed in the slurry reactor by uniting with hydrocarbon side reaction products. Additional conversion of normal butane to isobutane is also effected in the slurry reactor. As the top of the slurry reactor is approached, there is progressively less free aluminum chloride in the isomerization products, and the catalyst withdrawn as side stream from the upper portion of the slurry reactor is substantially completely spent. This substantially completely spent catalyst may be used for promoting hydrocarbon conversions other than isomerization.

An integral settling zone is provided in the uppermost part of the slurry reactor to permit separation of the inactive aluminum chloride-hydrocarbon complexes from the normal butane, isobutane, and hydrogen chloride. A separate settler may also be employed to remove any trace of complexes that are not removed in the integral settling zone. The remainder of the equipment for separating hydrogen chloride, normal butane, and isobutane into the individual components, is conventional. While in the embodiment shown in the figure only one aluminum chloride reactor is employed, continuous operation may require several aluminum chloride reactors so that when the aluminum chloride in one reactor is reduced below an economic operating level, the flow can be diverted to another reactor while the depleted reactor is being emptied of its slurry and is being recharged with fresh solid aluminum chloride.

The feed to the aluminum chloride reactor and to the slurry reactor is divided so that the desired proportion of the isomerization reaction is obtained in each reactor and so that the desired amount of catalyst is being transferred to the slurry reactor in the butane effluent from the aluminum chloride reactor. The important factor in this division is the split which will permit substantially complete conversion of the aluminum chloride in the butane-hydrogen chloride solution to inactive aluminum chloride-hydrocarbon complexes while maintaining the yield per pass at about 40 to about 50 per cent and the ultimate yield at about 90 to about 97 per cent.

Now, referring to the figure, liquid normal butane is introduced through conduit 8 by pump 9, conduit 10 and valve 11 into a hydrogen chloride absorber 12 where it is mixed with hydrogen chloride introduced through conduit 13. From hydrogen chloride absorber 12, a butane-hydrogen chloride solution flows into a hydrogen chloride-butane accumulator 14. Advantageously, the liquid butane may contain 2 to 4 mol per cent of hydrogen chloride. From the hydrogen chloride accumulator 14, the butane-hydrogen chloride solution is pumped by pump 15 through conduits 16 and 17. From conduit 17, the butane-hydrogen chloride solution is divided into two parts. One part is passed through valve 18, heater 19, and conduit 20 into the bottom of an aluminum chloride reactor 21. The other part is passed through valve 22, heater 23, and conduit 24 into the bottom of a slurry reactor 25. The butane-hydrogen chloride solution is divided so that the desired proportion of the reaction is obtained in each reactor and an adequate amount of catalyst is transferred to slurry reactor 25 in the butane effluent from aluminum chloride reactor 21. Aluminum chloride reactor 21 may be equipped with a removable plate 26 or any other suitable means for introducing solid aluminum chloride which may be in either granular or lump form. As the butane-hydrogen chloride mixture flows up through the solid aluminum chloride in aluminum chloride reactor 21, some normal butane is isomerized to isobutane and some hydrocarbon side reaction products are formed. The hydrocarbon side reaction products are believed to be mixtures of cracking, polymerization and alkylation products. The hydrocarbon side reaction products react in part with solid aluminum chloride to form aluminum chloride-hydrocarbon complexes. At this point in the process the complexes usually contain some free aluminum chloride so that they are more correctly referred to as aluminum chloride - hydrocarbon complex slurry. A minor proportion of the aluminum chloride-hydrocarbon complex slurry is removed with the butanes and aluminum chloride in suspension and solution from the top of aluminum chloride reactor 21 through conduit 27 and valve 28, and is combined with the other portion of the normal butane-hydrogen chloride solution in conduit 24. The combined charge is then introduced into the bottom of slurry reactor 25. The disposition of the proportion of the aluminum chloride-hydrocarbon complex slurry which remains in the aluminum chloride reactor will be discussed later. The slurry reactor may be provided with a distributing plate 29 or other distributing means.

As the combined charge passes upwardly through the slurry reactor, further isomerization of normal butane occurs and the aluminum chloride - hydrocarbon complex slurry settles out. Also, additional hydrocarbon side reaction products are formed. The additional hydrocarbon side reaction products react with the free aluminum chloride picked up by the butane stream to form additional quantities of aluminum chloride-hydrocarbon complexes. The hydrocarbon side reaction products combine with active aluminum chloride-hydrocarbon complexes to form inactive aluminum chloride - hydrocarbon complexes which are withdrawn as a side stream from the upper portion of slurry reactor 25 through conduit 34. The reaction conditions are controlled so that the complexes leaving the upper portion of the slurry reactor contain substantially no free aluminum chloride and are inactive aluminum chloride-hydrocarbon complexes.

Free aluminum chloride introduced into slurry reactor 25 with the butane stream in solution and suspension is generally in excess of that which can be converted to complexes by the hydrocarbon side reaction products formed in aluminum chloride reactor 21. Therefore, the relative amounts of the butane-hydrogen chloride stream passing to the aluminum chloride reactor and to the slurry reactor through valve 18, heater 19, and conduit 20 and through valve 22, heater 23 and conduit 24, respectively, are an important factor in the present invention. For instance, the butane effluent from the aluminum chloride reactor must contain enough aluminum chloride or active aluminum chloride-hydrogen complexes to promote the isomerization of the butane-hydrogen chloride charge in the slurry reactor. If too little of butane-hydrogen chloride charge passes through the aluminum chloride reactor, then there will be a deficiency of aluminum chloride or aluminum chloride-hydrocarbon complexes in the slurry reactor and the conversion of normal butane to isobutane will fall below a commercially desirable figure. If too much of the butane-hydrogen chloride charge passes through the aluminum chloride reactor, then there will be an excess of aluminum chloride in the slurry reactor. An excess of aluminum chloride in the slurry reactor is undesirable because aluminum chloride will be carried out in the butane effluent, thus constituting a waste of valuable catalyst and causing a variety of mechanical difficulties such as the corrosion and erosion of equipment and the plugging of transfer lines. Also, when an excess of aluminum chloride is present in the slurry reactor, catalyst containing considerable activity is withdrawn as spent catalyst, further constituting a waste. The correct division of the butane-hydrogen chloride charge will vary with the desired yield per pass and the design of the apparatus but can be readily determined in a few trial runs.

When the solid aluminum chloride in aluminum chloride reactor 21 has been substantially deactivated and slurried, as evidenced by a reduced yield per pass as evidenced by the fact that over about 90 per cent of the fresh butane is required as charge to the first reactor, the slurry is transferred from aluminum chloride reactor 21 to slurry reactor 25. This is accomplished by closing valves 18 and 28 and then introducing butane under pressure through valve 30 and conduit 31 into the top of aluminum chloride reactor 21, thus forcing the slurry out of the bottom of aluminum chloride reactor 21 through valve 32 and conduit 33 into the bottom of slurry reactor 25. An equivalent amount of aluminum chloride-hydrocarbon complexes is simultaneously withdrawn through conduit 34.

Alternatively, the unit may include several aluminum chloride reactors so that when the aluminum chloride has been completely converted into slurry in one of them, the flow can be switched to another reactor while the slurry is being transferred to the slurry reactor. The slurry reactor is usually operated continuously, and spent catalyst as inactive aluminum chloride-hydrocarbon complexes is withdrawn as a side stream near the top of the reactor through conduit 34 and valve 35 into a complex accumulator 36. Spent catalyst is periodically withdrawn from accumulator 36 through valve 85 and conduit 86.

An integral settling zone 37 is provided at the top of the slurry reactor, and a stream containing normal butane, isobutane, hydrogen chloride and a trace of complexes is withdrawn at the top of this zone through conduit 38. This stream is then introduced into a complex settler 39 where the remaining trace of insoluble complexes is settled out. Settler 39 is provided at its bottom with a draw-off conduit 40 containing valve 41 for removing the complexes. From the complex settler 39, the normal butane, isobutane and hydrogen chloride is passed through conduit 42, cooler 43 and back-pressure valve 44 into a hydrogen chloride stripper 45 in which the hydrogen chloride is vaporized and taken overhead while the mixed butanes are removed from the bottom.

Hydrogen chloride stripper 45 is provided at its bottom with a reboiler system comprising conduit 46, heating coil 47 and conduit 48 by means of which the butanes may be heated to remove a substantial proportion of the hydrogen chloride. The hydrogen chloride together with some vaporized hydrocarbon is withdrawn from the top of stripper 45 through conduit 49 into a cooling coil 50 and through conduit 51 into a settler 52 to condense and settle out contained butanes. The condensed butanes are removed from the bottom of settler 52 and are returned to the top of stripper 45 through conduit 53 while the hydrogen chloride is removed from the top of settler 52 and is recycled to accumulator 14 through conduits 54 and 13.

The bottom of hydrogen chloride stripper 45 is provided with a liquid level controller 55 which automatically removes the butanes through conduit 56 and introduces them into cooler 57. From cooler 57, the butanes are passed through conduit 58 into conduit 59 where they are mixed with caustic and then passed into caustic mixer 60. The butanes and caustic are removed from the top of caustic mixer 60 through conduit 68 and are introduced into a caustic settler 69. A portion of the caustic which settles out in settler 69 is recycled through conduit 64, valve 65, conduit 66 and pump 67 to caustic mixer 60. The remainder of the caustic is withdrawn as spent caustic through conduit 62 and valve 63. Fresh caustic enters the system through conduit 61.

The effluent from caustic settler 69 consisting of normal butane and isobutane is passed through conduit 70 into a butane accumulator 71. From butane accumulator 71, the butanes are pumped through conduit 72 by pump 73 into a fractionator 74. Isobutane together with some normal butane is removed from the top of fractionator 74 through conduit 75, and cooler 76, and is introduced through conduit 77 into settler 78. A portion of the vaporized butanes is condensed in cooler 76 and is returned as reflux from the bottom of settler 78 through conduit 79 to the top of fractionator 74. Isobutane is removed as product through conduit 80. Fractionator 74 is provided at its bottom with a reboiler system comprising conduit 81, heating coil 82 and conduit 83 by means of which heat is supplied for vaporizing the isobutane. Normal butane is recycled to the beginning of the process through conduit 84. If the formation of pentanes or heavier hydrocarbons in the reaction makes it desirable or necessary, all or a portion of the normal butane may be withdrawn from conduit 84 and fractionated to remove the pentanes or heavier hydrocarbons before returning the normal butane to conduit 8.

In carrying out the process of our invention we utilize a pressure sufficient to maintain the butanes in a liquid phase at the corresponding isomerization reaction temperature which is employed. The isomerization reaction temperature is coordinated with the space velocity to give an ultimate yield of isobutane substantially less than 100 per cent, advantageously between about 90 and about 97 per cent, and to produce some hydrocarbon side reaction products which are believed to be mixtures of cracking, polymerization and alkylation products. The following is a tabulation of some typical operating conditions and the results obtained when operating in accordance with the process of our invention:

TABLE II

*Typical conditions for isomerization of normal butane*

| | |
|---|---|
| Type of hydrocarbon feed | Normal butane |
| Hydrocarbon phase | Liquid |
| HCl in charge to reactors, mol per cent | 2 to 4 |
| Space velocity, liquid volume of hydrocarbon feed per hour per volume of catalyst | 6–8 |
| Temperature, °F.: | |
|   First reaction zone | 225 |
|   Second reaction zone | 260 |
| Pressure, p. s. i. | 400 (minimum) |
| Catalyst life, gallons of isobutane per pound of aluminum chloride | Above 40 |
| HCl consumption, gallons of isobutane per pound of hydrogen chloride | Above 400 |
| Isobutane made, liquid volume per cent of feed per pass | 40–50 |

The above-described process may be practiced with either a pure butane feed or with butanes containing as much as 7 to 8 per cent of butenes and 10 to 12 per cent of pentanes. When such impurities are present, however, it is to be understood that additional fractionation equipment may be required in order to prevent the normal butane recycle stream from building up with impurities.

The foregoing specification and description include the essential and distinctive thought of our invention, but it is to be distinctly understood that the same may be modified in various ways and/or combined with various other details without affecting the particular results obtained and without departing from the spirit of the invention or the scope of the appended claims, in which we intend to claim all the patentable novelty inherent in our invention.

What we claim is:

1. A liquid phase process of producing isobutane substantially free from aluminum chloride comprising mixing a charge of normal butane with hydrogen chloride, passing the normal butane-hydrogen chloride mixture in an amount progressing from about 10 to about 90 per cent of the total mixture through a first isomerizing zone containing solid aluminum chloride at a temperature within the range of 160° to 300° F. and at a space velocity between about 2 and about 8, contacting in a second isomerizing zone the effluent stream from the first isomerizing zone and the remainder of the normal butane-hydrogen chloride mixture with a body of aluminum chloride-hydrocarbon complex slurry at a temperature within the range of 160° to 300° F. and at a space velocity between about 2 and about 8 whereby normal butane is isomerized to isobutane in an amount corresponding to an ultimate yield of isobutane substantially less than 100 per cent and also some hydrocarbon side reaction products are formed, reacting the products resulting from the isomerization of normal butane and aluminum chloride freed from said complex whereby said hydrocarbon side reaction products react with said free aluminum chloride, and withdrawing an isomerization product free from aluminum chloride.

2. A liquid phase process of producing isobutane substantially free from aluminum chloride comprising mixing a charge of normal butane with hydrogen chloride, passing the normal butane-hydrogen chloride mixture in an amount progressing from about 10 to about 90 per cent of the total mixture through a first isomerizing zone containing solid aluminum chloride at a temperature within the range of about 200° to 260° F. and at a space velocity between about 2 and about 8, contacting in a second isomerizing zone the effluent stream from the first isomerizing zone and the remainder of the normal butane-hydrogen chloride mixture with a body of aluminum chloride-hydrocarbon complex slurry at a temperature within the range of 200° to 260° F. and at a space velocity between about 2 and about 8 whereby normal butane is isomerized to isobutane in an amount corresponding to an ultimate yield of isobutane substantially less than 100 per cent and also some hydrocarbon side reaction products are formed, reacting the products resulting from the isomerization of normal butane and aluminum chloride freed from said complex whereby said hydrocarbon side reaction products react with said free aluminum chloride, and withdrawing an isomerization product free from aluminum chloride.

3. A liquid phase process of producing isobutane substantially free from aluminum chloride comprising mixing a charge of normal butane with hydrogen chloride, passing the normal butane-hydrogen chloride mixture in an amount progressing from about 10 to about 90 per cent of the total mixture through a first isomerizing zone containing solid aluminum chloride at a temperature within the range of 200° to 260° F. and at a space velocity between about 2 and about 8, contacting in a second isomerizing zone the effluent stream from the first isomerizing zone and the remainder of the normal butane-hydrogen chloride mixture with a body of aluminum chloride-hydrocarbon complex slurry at a temperature within the range of 200° to 260° F. and at a space velocity between about 2 and about 8 whereby normal butane is isomerized to isobutane in an amount corresponding to an ultimate yield of isobutane between about 90 and 97 per cent and about 10 to about 3 per cent by weight of hydrocarbon side reaction products are formed, reacting the products resulting from the isomerization of normal butane and aluminum chloride freed from said complex whereby said hydrocarbon side reaction products react with said free aluminum chloride, and withdrawing an isomerization product free from aluminum chloride.

LESLIE U. FRANKLIN.
CHARLES F. PLUMHOFF.

REFERENCES CITED

The following references are of record in the file of this patent:

UNITED STATES PATENTS

| Number | Name | Date |
|---|---|---|
| 2,342,124 | Danforth | Feb. 22, 1944 |
| 2,354,851 | Danforth | Aug. 1, 1944 |
| 2,374,507 | Schulze | Apr. 24, 1945 |
| 2,378,685 | Carney | June 19, 1945 |
| 2,378,734 | Kiersted, Jr. | June 19, 1945 |
| 2,389,651 | Strawn | Nov. 27, 1945 |
| 2,401,242 | Hachmuth | May 28, 1946 |
| 2,408,941 | Mavity et al. | Oct. 8, 1946 |
| 2,409,260 | D'Ouville et al. | Oct. 15, 1946 |
| 2,412,675 | Danforth | Dec. 17, 1946 |
| 2,417,201 | Horton | Mar. 11, 1947 |

FOREIGN PATENTS

| Number | Country | Date |
|---|---|---|
| 556,481 | Great Britain | Oct. 6, 1943 |

Certificate of Correction

Patent No. 2,454,149.  November 16, 1948.

LESLIE U. FRANKLIN ET AL.

It is hereby certified that errors appear in the printed specification of the above numbered patent requiring correction as follows:

Column 5, line 63, for "isobutane par" read *isobutane per*; column 6, line 42, for the word "reaction" read *reactor*; column 8, line 57, for "hydrogen" read *hydrocarbon*; column 10, line 65, Table II, for "recation" read *reaction*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*